Sept. 10, 1940.  R. W. SCOTT  2,214,147
MIXING DEVICE
Filed Feb. 11, 1938
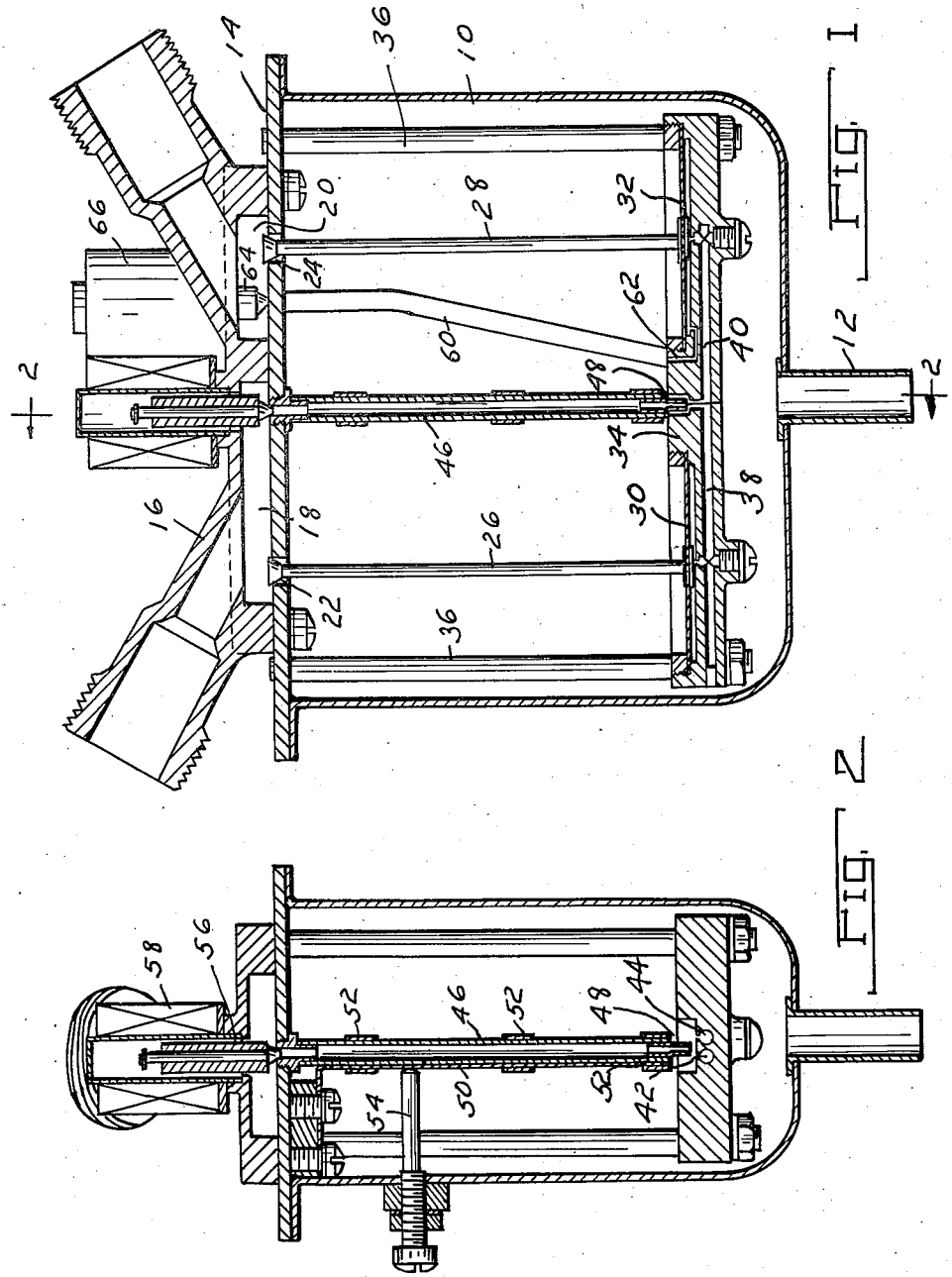
INVENTOR.
RAY W. SCOTT
BY McConkey Davison & Booth
ATTORNEYS.

Patented Sept. 10, 1940

2,214,147

UNITED STATES PATENT OFFICE 2,214,147

MIXING DEVICE

Ray W. Scott, Detroit, Mich., assignor to Bendix Home Appliances, Inc., South Bend, Ind., a corporation of Delaware Application February 11, 1938, Serial No. 189,967

5 Claims. (Cl. 236—12)

This invention relates to mixing devices and more particularly to devices for mixing hot and cold fluids such as water to maintain the mixture at a substantially constant temperature.

One of the objects of the invention is to provide a mixing device in which the fluid to be mixed is controlled by valves operated by fluid power devices which are supplied with actuating fluid under the control of means responsive to a function of the mixed fluid. Preferably one or more of the fluids to be mixed is utilized as the actuating fluid for the power devices.

Another object of the invention is to provide a mixing device having power operated valves in which only one valve may be opened or all of the valves may be opened simultaneously. If desired the power means may be provided with remotely operated controls.

Another object of the invention is to provide a mixing device for hot and cold fluids having fluid power operated valves in which the supply of actuating fluid to the power devices is automatically controlled in response to the temperature of the mixed fluids. Preferably the actuating fluid is supplied through a flexible tube adapted to register more or less with spaced inlet ports to the power devices and moved by a bimetal thermostat responsive to the temperature of the mixed fluids.

Other objects, advantages and novel features of the invention will be apparent from the following description of the embodiment shown in the accompanying drawing, in which:

Figure 1 is a central section through a mixing device embodying the invention; and Figure 2 is a section on the line 2—2 of Figure 1.

The illustrated mixing device is particularly adapted to mix hot and cold water to obtain a mixture at a substantially constant temperature and comprises a mixing chamber 10 having an outlet pipe 12 at its bottom and a flat plate 14 closing its top. The plate 14 carries a head 16 formed with a cold water inlet 18 and a hot water inlet 20 communicating respectively with sources of hot and cold water. The inlet 18 and 20 communicate with the mixing chamber through ports 22 and 24 respectively.

In order to control the proportions of hot and cold water, valves 26 and 28 are provided controlling the ports 22 and 24 respectively and operated by diaphragms 30 and 32. The diaphragms are carried by a block 34 supported from the plate 14 by bolts 36. A pair of passages 38 and 40 are provided in the block 34 communicating with the diaphragms 30 and 32 respectively and having spaced inlet openings 42 and 44 arranged side by side substantially at the center of the block.

Actuating fluid for the diaphragms is supplied through a flexible tube 46 connected at its upper end to the inlet 18 and having a discharge nozzle 48 at its lower end adapted to discharge water under pressure into the inlet openings 42 and 44. When the nozzle 48 is substantially centered between the openings, both diaphragms will be subjected to equal pressure, but as it is moved more nearly into register with one opening and out of register with the other, the pressure under one diaphragm will increase, while that under the other diaphragm decreases.

The position of the nozzle 48 is controlled by a bimetal thermostatic strip 50 secured at its upper end to the plate 14 and carrying a series of clamps 52 which connect it to the tube 46. A setting screw 54 may be provided to adjust the setting of the strip 50.

Admission of water to the tube 46 is controlled by a pilot valve 56 which is normally closed and adapted to be opened by a solenoid 58. When the solenoid 58 is energized, water under pressure will flow from inlet 18 through the tube 46 and will be discharged from the nozzle 48 into the inlet openings 42 and 44. This creates pressure below diaphragms 30 and 32 to open the valves 26 and 28, admitting both hot and cold water to the mixing chamber. If the temperature of the resultant mixture is that for which the strip 50 is adjusted, the nozzle 48 will be centered between openings 42 and 44 to open both valves 26 and 28 the same amount. If, however, the temperature should be higher or lower than that desired, the nozzle will be deflected to open one of the valves further, thereby to increase the supply of either cold or hot water and decrease the supply of the other to bring the temperature back to the desired value.

In order to open one of the valves without opening the other, separate means may be provided to conduct water to one only of the diaphragms. As shown, a pipe 60 is connected to the inlet 20 and to a passage 62 leading to the space below the diaphragm 32. The passage 60 is controlled by a pilot valve 64 operated by a solenoid 66.

When the valve 64 is opened by energization of the solenoid 66, water under pressure from the inlet 20 will flow to the diaphragm 32 to open the valve 28. At this time hot water from inlet 20 will be admitted to the mixing chamber regardless of the operation of the bimetal strip.

While the invention has been particularly described in connection with a water mixing device, it will be apparent that it might be employed equally well to control the mixing of any other desired fluids and that numerous other changes might be made therein. It is therefore not intended to limit the scope of the invention to the exact form shown, nor otherwise than by the terms of the appended claims.

What is claimed is:

1. A mixing device comprising a mixing chamber, inlets for fluids to be mixed, valves controlling communication of said inlets with the mixing chamber, fluid operated power means connected to each of said valves and having spaced inlet openings for operating fluid, a tube connected to one of said first named inlets and having a movable discharge end adapted to discharge fluid into said inlet openings, and means responsive to a function of the mixed fluids in the mixing chamber to move said discharge end to vary the relative pressure effects on the several inlet openings.

2. A mixing device for hot and cold fluids comprising a mixing chamber, hot and cold fluid inlets, a pair of normally closed valves controlling communication of said inlets respectively with the mixing chamber, individual fluid operated power means connected to each of said valves to open them, a tube to conduct fluid from one of said inlets to said power means, valve means to open and close said tube to open and close said first-named valves, and means responsive to the temperature of the mixed fluid in the mixing chamber to control communication of said tube with the power means respectively thereby to control the valves.

3. A mixing device for hot and cold fluids comprising a mixing chamber, hot and cold fluid inlets, a pair of valves controlling communication of said inlets respectively with the mixing chamber, fluid operated power means connected to each of said valves, a tube to conduct fluid from one of said inlets to said power means, means responsive to the temperature of the mixed fluid in the mixing chamber to control communication of said tube with the power means respectively thereby to control the valves, and a second tube connected to one of said inlets and to one only of the power means to open one only of said valves.

4. A mixing device for hot and cold fluids comprising a mixing chamber, hot and cold fluid inlets, a pair of valves controlling communication of said inlets respectively with the mixing chamber, fluid operated power means within said mixing chamber connected to each of said valves, said power means having spaced fluid inlet openings, a tube connected to one of said first named inlets and having a movable discharge end adapted to register with said inlet openings, and thermostatic means responsive to the temperature of the fluid in the mixing chamber to move said discharge end.

5. A mixing device for hot and cold fluids comprising a mixing chamber, hot and cold fluid inlets, a pair of valves controlling communication of said inlets respectively with the mixing chamber, fluid operated power means connected to each of said valves, said power means having spaced fluid inlet openings, a flexible tube connected to one of said first named inlets and having a discharge end adapted to register with said inlet openings, and thermostatic means responsive to the temperature of the fluid in the mixing chamber to move said discharge end, said thermostatic means comprising a bimetal strip lying along and secured to said flexible tube.

RAY W. SCOTT.